United States Patent
Cabri et al.

(10) Patent No.: US 10,414,830 B2
(45) Date of Patent: *Sep. 17, 2019

(54) CRYSTALLINE FORMS OF PER-CHLORO-γ-CYCLODEXTRINES

(71) Applicant: FRESENIUS KABI IPSUM S.R.L., Milan (IT)

(72) Inventors: Walter Cabri, Milan (IT); Antonio Ricci, Pescara (IT); Jacopo Zanon, Venice (IT); Saswata Lahiri, Ghaziabad (IN); Govind Singh, Ghaziabad (IN); Shivaji Haribhau Shelke, Ahmednagar (IN); Shridhar Reddy, Gurgaon (IN); Nitin Kumar, Delhi (IN); Madan Singh, Delhi (IN)

(73) Assignee: FRESENIUS KABI IPSUM S.R.L., Cassina de'Pecci (Milan) (IT)

( * ) Notice: Subject to any disclaimer, the term of this patent is extended or adjusted under 35 U.S.C. 154(b) by 0 days.

This patent is subject to a terminal disclaimer.

(21) Appl. No.: 15/779,040

(22) PCT Filed: Nov. 24, 2016

(86) PCT No.: PCT/IB2016/057088
§ 371 (c)(1),
(2) Date: May 24, 2018

(87) PCT Pub. No.: WO2017/089978
PCT Pub. Date: Jun. 1, 2017

(65) Prior Publication Data
US 2018/0346608 A1  Dec. 6, 2018

(30) Foreign Application Priority Data
Nov. 25, 2015 (IN) .......................... 3842/DEL/2015

(51) Int. Cl.
*C08L 5/16* (2006.01)
*C08B 37/16* (2006.01)

(52) U.S. Cl.
CPC ............ *C08B 37/0012* (2013.01); *C08L 5/16* (2013.01)

(58) Field of Classification Search
None
See application file for complete search history.

(56) References Cited

U.S. PATENT DOCUMENTS

| 2018/0171033 A1 | 6/2018 | Alaparthi et al. |
| 2018/0355070 A1 | 12/2018 | Cabri et al. |

FOREIGN PATENT DOCUMENTS

| CN | 101864003 A | 10/2010 |
| CN | 104844732 A2 | 8/2015 |
| CN | 105273095 A | 1/2016 |
| EP | 3 380 530 A1 | 10/2018 |
| EP | 3 380 554 A1 | 10/2018 |
| IN | 20161008861 | 3/2015 |
| IN | 2089/MUM/2015 | 5/2015 |
| IN | 3842/DEL/2015 | 11/2015 |
| IN | 3843/DEL/2015 | 11/2015 |
| WO | WO 2001/040316 A1 | 6/2001 |
| WO | WO 2012/025937 A1 | 3/2012 |
| WO | WO 2014/125501 A1 | 8/2014 |
| WO | WO 2016/194001 A1 | 8/2016 |
| WO | WO 2017/089966 A1 | 6/2017 |
| WO | WO 2017/163165 A1 | 9/2017 |

OTHER PUBLICATIONS

Chmurski et al., "An Improved Synthesis of 6-Deoxyhalo Cyclodextrins via Halomethylenemorpholinium Halides Vilsmeir-Haack Type Reagents," *Tetrahedron Letters* 38(42): 7365-7368 (1997).
European Medicines Agency, "Test Procedures and Acceptance Criteria for New Drug Substances and New Drug Products: Chemical Substances," Document CPMP/ICH/367/96 (2000) 32 pgs.
Hunt et al., "Structure and stability of columnar cyclomaltooctaose (γ-cyclodextrin) hydrate," *Carbohydrate Research* 340(9): 1631-1637 (2005).
European Patent Office, International Search Report in International Application No. PCT/IB2016/057088 (dated Feb. 21, 2017).
European Patent Office, Written Opinion in International Application No. PCT/IB2016/057088 (dated Feb. 21, 2017).
International Bureau of WIPO, International Preliminary Report on Patentability in International Application No. PCT/IB2016/057088 (dated May 29, 2018).
Chmurski et al., "An Improved Synthesis of Per(6-Deoxyhalo) Cyclodextrins Using N-Halosuccinimides-Triphenylphosphine in Dimethylformamide," *Supramolecular Chemistry*, vol. 12, pp. 221-224 (2000).
European Patent Office, Third Party Observation filed in European Patent Application No. 16822742.9 (Oct. 4, 2018).
European Patent Office, Third Party Observation filed in European Patent Application No. 16822270.1 (Oct. 7, 2018).
Comparison Report—Comparison of the procedures as disclosed in Example 3 of WO 2001/040316 A1, Example 1 of WO 2012/025937 A1, and Example 1 of WO 2014/125501 A1, and as reported in European Patent Application No. 16822742.9 (Feb. 1, 2019).
Comparison Report—Comparison of the procedures as disclosed in Example 3 of WO 2001/040316 A1, Example 1 of WO 2012/025937 A1, and Example 1 of WO 2014/125501 A1, and as reported in European Patent Application No. 16822270.1 (Feb. 1, 2019).

(Continued)

*Primary Examiner* — Layla D Berry
(74) *Attorney, Agent, or Firm* — Leydig, Voit & Mayer, Ltd.

(57) ABSTRACT

The present application provides crystalline forms of 6-per-deoxy-6-per-chloro-γ-cyclodextrin, and polymorphs thereof. The present application also provides methods for preparing said polymorphs by dissolving 6-per-deoxy-6-per-chloro-γ-cyclodextrin in dimethylformamide and using an anti-solvent of a water/alcohol mixture.

11 Claims, 3 Drawing Sheets

(56) References Cited

OTHER PUBLICATIONS

Experimental Report—Reproduction of examples 1 and 3-6 of the European Patent Application No. 16822742.9 (Feb. 1, 2019).
Experimental Report—Reproduction of examples 1-4 of the European Patent Application No. 16822270.1 (Feb. 1, 2019).
Guillo et al., "Synthesis of symmetrical cyclodextrin derivatives bearing multiple charges," *Bull. Soc. Chim. Fr.* 132(8): 857-866 (1995).
Liu et al., "A Convenient Procedure for the Formation of Per(6-deoxy-6-halo)cyclodextrins Using the Combination of Tetraethylammonium Halide with [$Et_2NSF_2$]$BF_4$," *Synthesis* 45(22): 3103-3105 (2013).
Okamatsu et al., "Design and evaluation of folate-appended α-, β-, and γ-cyclodextrins having a caproic acid as a tumor selective antitumor drug carrier in vitro and in vivo," *Biomacromolecules* 14(12): 4420-4428 (2013).
International Bureau of WIPO, International Preliminary Report on Patentability in International Application No. PCT/IB2016/057056 (dated May 29, 2018).
International Bureau of WIPO, International Preliminary Report on Patentability in International Application No. PCT/IB2017/051594 (dated Sep. 25, 2018).
European Patent Office, Third Party Observation filed in European Patent Application No. 16822742.9 (Feb. 14, 2019).
European Patent Office, Third Party Observation filed in European Patent Application No. 16822742.9 (Apr. 9, 2019).
European Patent Office, Third Party Observation filed in European Patent Application No. 16822270.1 (Feb. 14, 2019).
European Patent Office, Third Party Observation filed in European Patent Application No. 16822270.1 (Apr. 9, 2019).
European Patent Office, Third Party Observation filed in European Patent Application No. 17720572.1 (Mar. 19, 2019).
European Patent Office, Third Party Observation filed in European Patent Application No. 17720572.1 (dated May 29, 2019).

CRYSTALLINE FORMS OF PER-CHLORO-γ-CYCLODEXTRINES

CROSS-REFERENCE TO RELATED APPLICATIONS

This patent application is the U.S. national phase of International Patent Application No. PCT/IB2016/057088, filed on Nov. 24, 2016, which claims the benefit of Indian Patent Application No. 3842/DEL/2015, filed Nov. 25, 2015, the disclosures of which are incorporated herein by reference in their entireties for all purposes.

FIELD OF THE INVENTION

The present application provides crystalline forms of 6-per-deoxy-6-per-chloro-γ-cyclodextrin, polymorphs thereof and methods to produce it. More particularly, the application relates to a process of dissolving 6-per-deoxy-6-per-chloro-γ-cyclodextrin and its isolation as a crystalline compound.

BACKGROUND OF THE INVENTION

Cyclodextrins (CD) are a family of cyclic oligosaccharides composed of α-(1,4) linked glucopyranose subunits. According to the general accepted nomenclature of cyclodextrins an α (alpha)-cyclodextrin is a 6-membered ring molecule, a β (beta)-cyclodextrin is a 7-membered ring molecule and a γ (gamma)-cyclodextrin is a 8-membered ring molecule. Cyclodextrins are useful molecular chelating agents. They possess a cage-like supramolecular structure. As a result of molecular complexation phenomena CDs are widely used in many industrial products, technologies and analytical methods.

The γ (gamma)-cyclodextrin with a commercial interest is sugammadex. A key intermediate for preparing Sugammadex is 6-per-deoxy-6-per-chloro-γ-cyclodextrin of formula I.

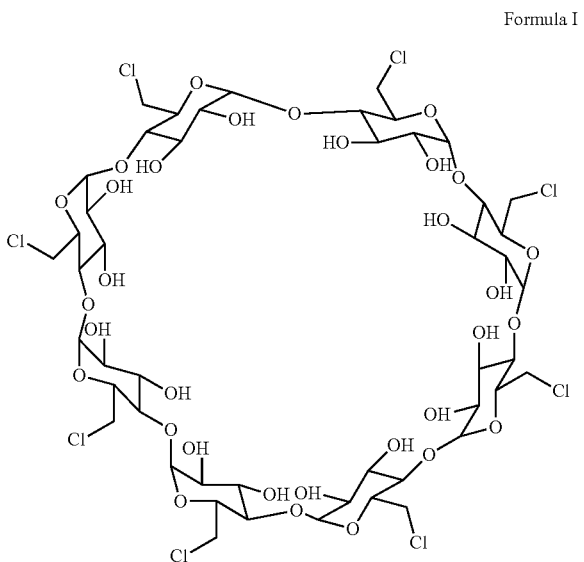 [SMILES: OC1C2OC(CCl)C(OC3OC(CCl)C(OC4OC(CCl)C(OC5OC(CCl)C(OC6OC(CCl)C(OC7OC(CCl)C(OC8OC(CCl)C(OC9OC(CCl)C(O2)C(O)C9O)C(O)C8O)C(O)C7O)C(O)C6O)C(O)C5O)C(O)C4O)C(O)C3O)C1O]

Formula I

The preparation of 6-per-deoxy-6-per-chloro-γ-cyclodextrin is disclosed in WO2012/025937. This document discloses the preparation of 6-per-deoxy-6-per-chloro-γ-cyclodextrin by chlorination of γ-cyclodextrin with a halogenating agent prepared from phosphorous pentachloride and dimethylformamide. After completion of the chlorination the solvent is removed to obtain a viscous residue. The viscous residue is diluted with water followed by adjusting the pH 8 with 5M sodium hydroxide to obtain a slurry. Said slurry is then filtered, washed with water and dried to give 6-per-deoxy-6-per-chloro-γ-cyclodextrin. The process disclosed in WO2012/025937A1 suffers from the following disadvantages:
(i) The halogenating agent, which is prepared by reaction of phosphorous pentachloride and dimethylformamide, produces numerous phosphorous species on reaction with dimethylformamide, and its subsequent use for the halogenation of γ-cyclodextrin also produces phosphate esters as impurities which are difficult to remove.
(ii) The removal of dimethylformamide after chlorination of γ-cyclodextrin gives highly viscous oil, which is very cumbersome to stir.
(iii) The filtration of 6-per-deoxy-6-per-chloro-γ-cyclodextrin is also very challenging due to its amorphous nature and it takes very long time for the filtration.
(iv) The purity of 6-per-deoxy-6-per-chloro-γ-cyclodextrin is also very low (about 22%).

WO2014/125501 discloses the preparation of 6-per-deoxy-6-per-chloro-γ-cyclodextrin by chlorination of γ-cyclodextrin with a halogenating agent, prepared from phosphorous pentachloride and dimethylformamide. After completion of the chlorination, the mixture is quenched with water. The obtained mixture is hydrolyzed with aqueous sodium hydroxide solution, filtered, washed repeatedly with water and dried to give 6-per-deoxy-6-per-chloro-γ-cyclodextrin.

The process disclosed in WO2014/125501A1 suffers from the following disadvantages:
(i) The halogenating agent, which is prepared by reaction of phosphorous pentachloride and dimethylformamide, produces numerous phosphorous species on reaction with dimethylformamide, and its subsequent use for the halogenation of γ-cyclodextrin also produces phosphate esters as impurities which are difficult to remove.
(ii) The filtration of 6-per-deoxy-6-per-chloro-γ-cyclodextrin is very challenging as it takes very long time for the filtration due to its amorphous nature.
(iii) The purity of 6-per-deoxy-6-per-chloro-γ-cyclodextrin is also very low (about 23%).

Thus, the prior art procedures for the preparation of 6-per-deoxy-6-per-chloro-γ-cyclodextrin suffer from the following disadvantages outlined below;
(i) The use of phosphorus based reagents for the halogenation of γ-cyclodextrin. The reagent produces unwanted impurities as by product which is very difficult to remove and require multiple purifications.
(ii) The handling of highly viscous reaction mixture of 6-per-deoxy-6-per-chloro-γ-cyclodextrin is very difficult.
(iii) The filtration of 6-per-deoxy-6-per-chloro-γ-cyclodextrin is also very challenging due to its amorphous nature.

SUMMARY OF THE INVENTION

Figure 1:
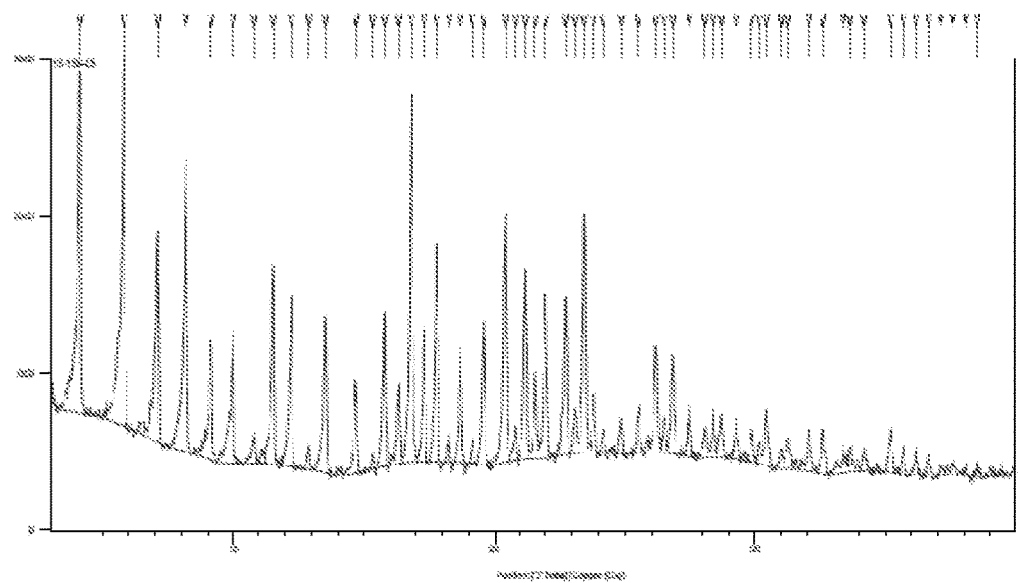
FIG. 1 is an illustration of a XRPD pattern of crystalline form I of 6-per-deoxy-6-per-chloro-γ-cyclodextrin.
Figure 2:
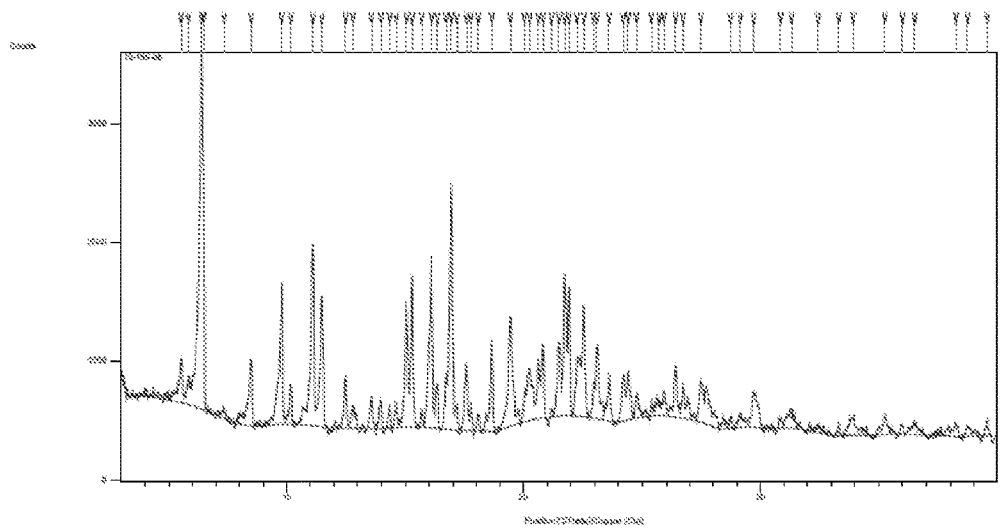
FIG. 2 is an illustration of a XRPD pattern of crystalline form II of 6-per-deoxy-6-per-chloro-γ-cyclodextrin.
Figure 3:
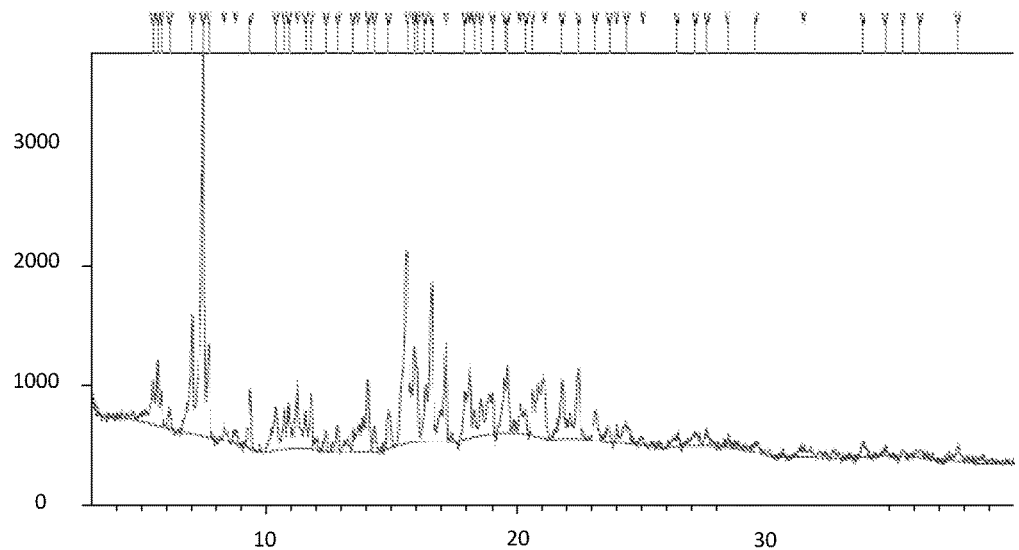
FIG. 3 is an illustration of a XRPD pattern of crystalline form III of 6-per-deoxy-6-per-chloro-γ-cyclodextrin.

In one aspect, the application provides a process of preparing crystalline 6-per-deoxy-6-per-chloro-γ-cyclodextrin of formula I,

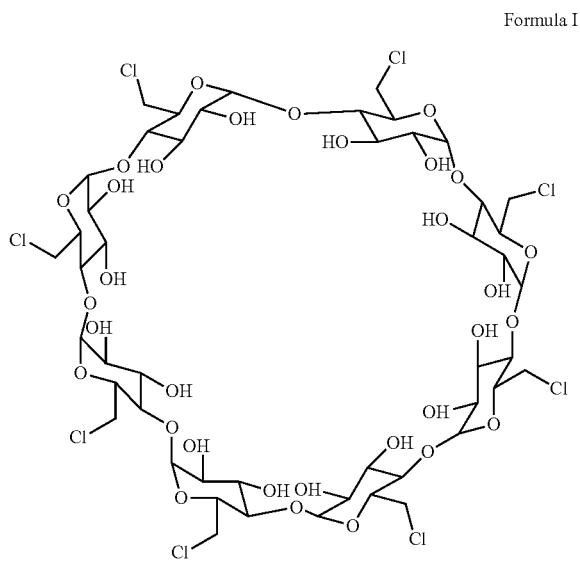 [SMILES: OC1C2OC(CCl)C(OC3OC(CCl)C(OC4OC(CCl)C(OC5OC(CCl)C(OC6OC(CCl)C(OC7OC(CCl)C(OC8OC(CCl)C(OC9OC(CCl)C(O2)C(O)C9O)C(O)C8O)C(O)C7O)C(O)C6O)C(O)C5O)C(O)C4O)C(O)C3O)C1O]

Formula I comprising the steps of:
a) dissolving 6-per-deoxy-6-per-chloro-γ-cyclodextrin in dimethylformamide,
b) adding a mixture of water and alcoholic solvent as anti-solvent,
c) isolating crystalline 6-per-deoxy-6-per-chloro-γ-cyclodextrin.

Another aspect of the present application provides crystalline forms I, II and III of 6-per-deoxy-6-per-chloro-γ-cyclodextrin of formula I.

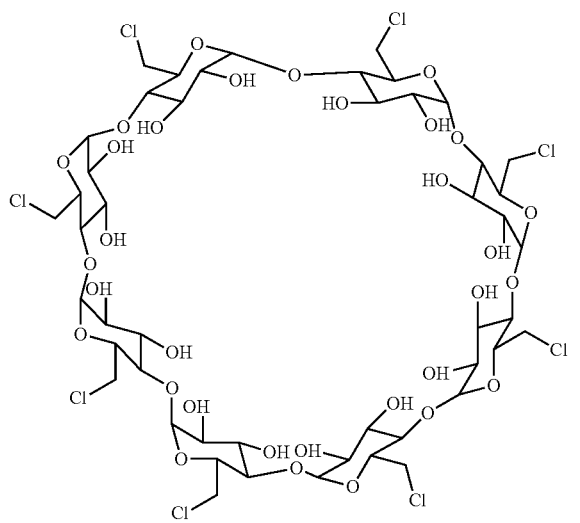

Formula I

DESCRIPTION OF THE INVENTION

Definitions

The following definitions are used in connection with the present application unless the context indicates otherwise.

The term "anti-solvent" refers to a liquid that, when combined with a solution of 6-per-deoxy-6-per-chloro-γ-cyclodextrin, for example, reduces solubility of the 6-per-deoxy-6-per-chloro-γ-cyclodextrin in the solution, causing crystallization or precipitation in some instances spontaneously, and in other instances with additional steps, such as seeding, cooling, scratching, and/or concentrating.

The term 6-per-deoxy-6-per-chloro-γ-cyclodextrin means a perhalogenated γ-cyclodextrin wherein the halogen is chloride of formula I. The term γ-cyclodextrin means a cyclodextrin of formula II.

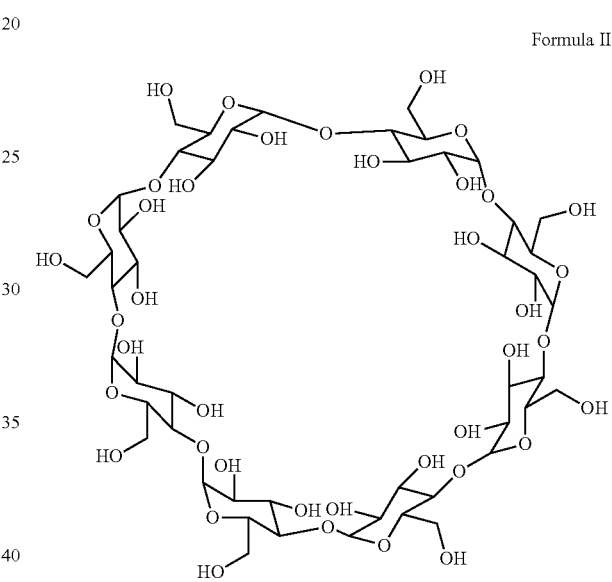

Formula II

The term crude 6-per-deoxy-6-per-chloro-γ-cyclodextrin means any 6-per-deoxy-6-per-chloro-γ-cyclodextrin as suitable starting material of the inventive process, regardless of the source obtained from or how prepared, the purity grade or impurity profile, crystalline form or amorphous form.

All percentages and ratios used herein are by weight of the total composition and all measurements made are at about 25° C. and about atmospheric pressure, unless otherwise designated. All temperatures are in degrees Celsius unless specified otherwise.

The terms "about," "general," "generally," and the like are to be construed as modifying a term or value such that it is not an absolute. Such terms will be defined by the circumstances and the terms that they modify as those terms are understood by those of skill in the art. This includes, at the very least, the degree of expected experimental error, technique error and instrument error for a given technique used to measure a value.

As used herein, the terms "comprising" and "comprises" mean the elements recited, or their equivalents in structure or function, plus any other element or elements which are not recited. The terms "having" and "including" are also to be construed as open ended. All ranges recited herein include the endpoints, including those that recite a range between two values. Whether so indicated or not, all values recited herein are approximate as defined by the circumstances, including the degree of expected experimental error, technique error, and instrument error for a given technique used to measure a value.

The term "optional" or "optionally" is taken to mean that the event or circumstance described in the specification may or may not occur, and that the description includes instances where the event occurs and instances where it does not.

In general, polymorphism refers to the ability of a substance to exist as two or more crystalline forms that have different spatial arrangements and/or conformations of molecules in their crystal lattices. Thus, "polymorphs" refer to different crystalline forms of the same substance in which the molecules have different spatial arrangements of the molecules, atoms, and/or ions forming the crystal. Different polymorphs may have different physical properties such as melting points, solubilities, X-ray diffraction patterns, etc.

Polymorphism may also include solvation or hydration products (also known as pseudopolymorphs) and amorphous forms. Differences in these forms could, in some cases, affect the quality or performance of the new drug products (European Medicines Agency; "Test Procedures and Acceptance Criteria for New Drug Substances and New Drug Products"; Document CPMP/ICH/367/96, May 2000).

In an aspect, the present application provides crystalline forms of 6-per-deoxy-6-per-chloro-γ-cyclodextrin. In detail it provides polymorphs form I, form II and form III and methods for preparing said forms.

The process for preparing crystalline 6-per-deoxy-6-per-chloro-γ-cyclodextrin based on the surprising finding that the use of dimethylformamide as solvent for 6-per-deoxy-6-per-chloro-γ-cyclodextrin and use of a mixture of water and alcoholic solvent as anti-solvent, specifically produces crystalline 6-per-deoxy-6-per-chloro-γ-cyclodextrin.

Any obtained crystalline 6-per-deoxy-6-per-chloro-γ-cyclodextrin can optionally be purified by a suitable purification method to achieve the desired purity of crystalline 6-per-deoxy-6-per-chloro-γ-cyclodextrin.

The process of the present application can also be used for purifying the crude 6-per-deoxy-6-per-chloro-γ-cyclodextrin by dissolving in dimethylformamide followed by addition of a mixture of water and alcoholic solvent to isolate purified crystalline 6-per-deoxy-6-per-chloro-γ-cylodextrin.

The isolated and/or purified crystalline form of 6-per-deoxy-6-per-chloro-γ-cyclodextrin may optionally be dried to get amorphous form.

The present application further provides a method for making crystalline form I of 6-per-deoxy-6-per-chloro-γ-cyclodextrin, comprising, dissolving 6-per-deoxy-6-per-chloro-γ-cyclodextrin in dimethylformamide, followed by addition of a mixture of water and methanol to isolate crystalline form I of 6-per-deoxy-6-per-chloro-γ-cyclodextrin.

The present application further provides a method for making crystalline form II of 6-per-deoxy-6-per-chloro-γ-cyclodextrin, comprising, dissolving 6-per-deoxy-6-per-chloro-γ-cyclodextrin in dimethylformamide, followed by addition of a mixture of water and ethanol or isopropanol to isolate crystalline form II of 6-per-deoxy-6-per-chloro-γ-cyclodextrin.

The present application further provides a method for making crystalline Form III of 6-per-deoxy-6-per-chloro-γ-cyclodextrin, comprising, dissolving 6-per-deoxy-6-per-chloro-γ-cyclodextrin in dimethylformamide, followed by addition of a mixture of water and tert-butanol to isolate crystalline form III of 6-per-deoxy-6-per-chloro-γ-cyclodextrin.

A useful ratio of the water and alcoholic solvent mixture may be in the range of 10/1 to 1/0.1 (v/v), preferably from 5/1 to 1/0.1 and most preferably from 2/1 to 1/0.05. The alcoholic solvents which may be used include, but are not limited to C1-C4 alcohols such as methanol, ethanol, propanol, isopropyl alcohol, n-butanol, iso-butanol, tert-butanol or mixtures thereof.

Interestingly, it is also observed that the choice of the alcohol influences the crystalline pattern of the isolated 6-per-deoxy-6-per-chloro-γ-cyclodextrin. In all cases, however, the crystalline pattern was recorded with wet samples of 6-per-deoxy-6-per-chloro-γ-cyclodextrin, i.e. the isolated crystals are not subjected to an additional and/or special drying step, like heating or vacuum drying.

Cyclodextrin and its derivatives are known to lose their crystalline habit upon drying (Hunt A. et al, Carbohydrate Res. 2005 Jul. 4; 340(9):1631-7). Nevertheless, the crystalline forms of the invention strongly improve the filtration time and quality of the intermediate.

A comparison with known prior art processes concerning filtration time and polymorphic form of 6-per-deoxy-6-per-chloro-γ-cyclodextrin is tabulated below (5 g substance each):

TABLE 1

| Reference Examples | Solvent | Anti-solvent | Filtration time | Polymorph |
| --- | --- | --- | --- | --- |
| WO2001/040316A1 (example 3) | Dimethyl-formamide | Water | >9 hr | Amorphous |
| WO2012/025937A1 (example 1) | Dimethyl-formamide | Water | >3 hr | Amorphous |
| WO2014/125501A1 (example 1) | Dimethyl-formamide | Water | >4 hr | Amorphous |
| Examples of the present application | Dimethyl-formamide | Water/ Methanol | <5 min. | Crystalline form I |
| | Dimethyl-formamide | Water/ Ethanol | <5 min. | Crystalline form II |
| | Dimethyl-formamide | Water/ Isopropanol | <5 min. | Crystalline form II |
| | Dimethyl-formamide | Water/ Tert-butanol | <5 min. | Crystalline form III |

It is evident from the comparative data that the filtration time has been reduced many folds due to the formation of crystalline 6-per-deoxy-6-per-chloro-γ-cyclodextrin as compared to the cumbersome filtration of amorphous material obtained from the known prior art procedures. It is also clearly observed that the use of water and alcoholic solvent as anti-solvent contributes to the formation of crystalline 6-per-deoxy-6-per-chloro-γ-cyclodextrin.

The isolated crystalline forms of 6-per-deoxy-6-per-chloro-γ-cyclodextrin has higher yield (about 94%) and purity (about 94%) as compared to the isolated amorphous form of 6-per-deoxy-6-per-chloro-γ-cyclodextrin of the known prior art methods, as reported in the reference examples 1, 2 and 3.

According to another aspect the present application provides novel crystalline forms I, II and III of 6-per-deoxy-6-per-chloro-γ-cyclodextrin.

The crystalline form I shows on X-ray diffraction a peak at an angle of refraction 2 theta ($\theta$), of 4.1, 5.8, 8.2, 16.8, 23.5±0.2 degrees; preferably it includes five or more peaks at angles of refraction 2 theta ($\theta$) selected from the group consisting of 4.1, 5.8, 7.1, 8.2, 9.1, 10.0, 10.8, 11.5, 12.2, 12.9, 13.5, 14.7, 15.3, 15.8, 16.3, 16.8, 17.3, 17.8, 18.3, 18.7, 19.1, 19.6, 20.4, 20.8, 21.2, 21.6, 22.0, 22.7, 23.1, 23.5, 23.8, 24.2, 24.9, 25.5, 26.2, 26.5, 26.8, 27.2, 28.1, 28.4, 28.7, 29.3, 29.9, 30.1, 30.4, 31.0, 31.3, 32.1, 32.6, 33.4, 33.7, 34.2, 35.2, 35.7, 36.2, 36.6, 37.1, 37.6, 38.1, and 38.5±0.2 degrees.

The crystalline form II shows on X-ray diffraction a peak at an angle of refraction 2 theta (θ), of 6.4, 11.1, 11.5, 16.1, 16.9±0.2 degrees; preferably it includes five or more peaks at angles of refraction 2 theta (θ) selected from the group consisting of 5.5, 5.8, 6.4, 6.5, 7.4, 8.5, 9.8, 10.2, 11.1, 11.5, 12.5, 12.8, 13.6, 14.0, 14.3, 14.6, 15.0, 15.3, 15.7, 16.1, 16.3, 16.7, 16.9, 17.2, 17.6, 17.8, 18.1, 18.7, 19.4, 20.1, 20.3, 20.6, 20.8, 21.2, 21.5, 21.7, 21.9, 22.3, 22.5, 22.9, 23.1, 23.6, 24.2, 24.4, 24.8, 25.4, 25.7, 25.9, 26.4, 26.7, 27.5, 28.7, 29.1, 29.7, 30.9, 31.3, 32.4, 33.3, 33.9, 35.2, 36.0, 36.5, 38.2, 38.7, 39.6±0.2 degrees.

The crystalline form III shows on X-ray diffraction a peak at an angle of refraction 2 theta (θ), of 7.5, 15.6, 15.9, 16.6, 17.2±0.2 degrees; preferably it includes five or more peaks at angles of refraction 2 theta (θ) selected from the group consisting of 5.5, 5.6, 5.8, 6.1, 7.0, 7.5, 7.7, 8.3, 8.8, 9.4, 10.4, 10.7, 10.9, 11.2, 11.5, 11.8, 12.4, 12.9, 13.5, 13.7, 14.1, 14.3, 14.9, 15.6, 15.9, 16.0, 16.4, 16.6, 17.2, 17.9, 18.1, 18.3, 18.6, 19.0, 19.5, 19.7, 20.2, 20.4, 20.7, 21.1, 21.9, 22.5, 23.2, 23.8, 24.0, 24.4, 25.1, 26.4, 27.2, 27.7, 28.5, 29.6, 31.6, 33.9, 34.8, 35.5, 36.2, 37.7±0.2 degrees.

The obtained crystalline forms I, II and III of 6-per-deoxy-6-per-chloro-γ-cyclodextrin can be used to prepare sugammadex as per the methods disclosed in WO2001/040316A1, WO2012/025937A1 and WO2014/125501A1.

Certain specific aspects of the present application will be explained in greater detail with reference to the following examples, which are provided only for purposes of illustration and should not be construed as limiting the scope of the disclosure in any manner.

EXAMPLES

To demonstrate the benefits of the present invention, examples of the prior art were reworked and indicated as reference example.

Reference Example 1 (Example 3 of WO2001/040316A1)

Preparation of 6-per-deoxy-6-per-iodo-γ-cyclodextrin

Triphenylphosphine (15 g) was dissolved in dimethylformamide (80 ml) at ambient temperature and iodine (15.2 g) was slowly added to the solution in 10-15 minutes. To this mixture was added dry γ-cyclodextrin (5 g) and the solution was heated to 70° C. and kept stirring at this temperature for 24 hour. The solution was allowed to cool before the addition of sodium methoxide (1.55 g in 25 ml of methanol). The solution thus obtained was stirred for 30 minutes, poured to 400 ml of methanol and evaporated under vacuum to obtain a dense oily residue. To this residue, 250 ml of water was added to get a dark sticky solid, which was filtered under vacuum. The solid was washed with water (3×50 ml) and methanol (3×50 ml) and dried under vacuum to obtain 2 g of 6-per-deoxy-6-per-iodo-γ-cyclodextrin as amorphous yellow powder. Yield: 40%; HPLC Purity: 20.3%

Reference Example 2 (Example 1 of WO2012/025937A1)

Preparation of 6-per-deoxy-6-per-chloro-γ-cyclodextrin

Phosphorous pentachloride (25.6 g) was slowly added to dimethylformamide (30 ml) at 0-5° C. The suspension was stirred at 25-30° C. for 1 hour before the addition of a solution of γ-Cyclodextrin (5 g) in dimethylformamide (40 ml). The suspension thus obtained was heated at 65-70° C. and stirred at this temperature for 14 hours. Dimethylformamide was removed under vacuum to obtain thick oil. Water (100 ml) was slowly added to the oil followed by sodium hydroxide 20% until pH reached the value of 8.0. The resulted suspension was stirred for 1 hour at 5-10° C. The suspension was filtered and dried under vacuum to obtain 2.5 grams of 6-per-deoxy-6-per-chloro-γ-cyclodextrin as amorphous yellow powder. Yield: 44.8%; HPLC Purity: 22.4%

Reference Example 3 (Example 1 of WO2014/125501A1)

Preparation of 6-per-deoxy-6-per-chloro-γ-cyclodextrin

Phosphorous pentachloride (25.6 g) was slowly added to dimethylformamide (20 ml) at 25-30° C. The suspension was stirred at 25-30° C. for 1 hour before the addition of γ-Cyclodextrin (5 g). The suspension thus obtained was heated at 65-70° C. and stirred at this temperature for 15 hours. The obtained mixture was slowly added to water (100 ml) and cooled at 10° C. followed by addition of sodium hydroxide 30% until pH reached the value of 7.5-8.0. The resulted suspension was stirred for 2 hour at this temperature. The suspension was filtered, washed with water (20 ml) and dried under vacuum to obtain 4.5 grams of 6-per-deoxy-6-per-chloro-γ-cyclodextrin as amorphous yellow powder. Yield: 80.7%; HPLC Purity: 23.0%

Example 1

Preparation and Isolation of Crystalline Form I of 6-per-deoxy-6-per-chloro-γ-cyclodextrin To a solution of 6-per-deoxy-6-per-chloro-γ-cyclodextrin (5 g) in dimethylformamide (25 ml) was added a mixture of water and methanol (1:1) to obtain a suspension. The suspension was stirred for 1 hour, filtered and the cake was washed two times with a mixture of water and methanol (1:1) to obtain crystalline form I of 6-per-deoxy-6-per-chloro-γ-cyclodextrin. HPLC Purity: 94.4%

Example 2

Preparation and Isolation of Crystalline Form II of 6-per-deoxy-6-per-chloro-γ-cyclodextrin To a solution of 6-per-deoxy-6-per-chloro-γ-cyclodextrin (5 g) in dimethylformamide (25 ml) was added a mixture of water and ethanol (1:1) to obtain a suspension. The suspension was stirred for 1 hour, filtered and the cake was washed two times with a mixture of water and ethanol (1:1) to obtain crystalline form II of 6-per-deoxy-6-per-chloro-γ-cyclodextrin. HPLC Purity: 94.9%

Example 3

Preparation and Isolation of Crystalline Form II of 6-per-deoxy-6-per-chloro-γ-cyclodextrin To a solution of 6-per-deoxy-6-per-chloro-γ-cyclodextrin (5 g) in dimethylformamide (25 ml) was added a mixture of water and isopropanol (1:1) to obtain a suspension. The suspension was stirred for 1 hour, filtered and the cake was washed two times with a mixture of water and isopropanol (1:1) to obtain crystalline form II of 6-per-deoxy-6-per-chloro-γ-cyclodextrin. HPLC Purity: 95.1%

Example 4

Preparation and Isolation of Crystalline Form III of 6-per-deoxy-6-per-chloro-γ-cyclodextrin To a solution of 6-per-deoxy-6-per-chloro-γ-cyclodextrin (5 g) in dimethylformamide (25 ml) was added a mixture of water and tert-butanol (1:1) to obtain a suspension. The suspension was stirred for 1 hour, filtered and the cake was washed two times with a mixture of water and tert-butanol (1:1) to obtain crystalline form III of 6-per-deoxy-6-per-chloro-γ-cyclodextrin. HPLC Purity: 97.4%

The invention claimed is:

1. A crystalline form of 6-per-deoxy-6-per-chloro-γ-cyclodextrin of formula I.

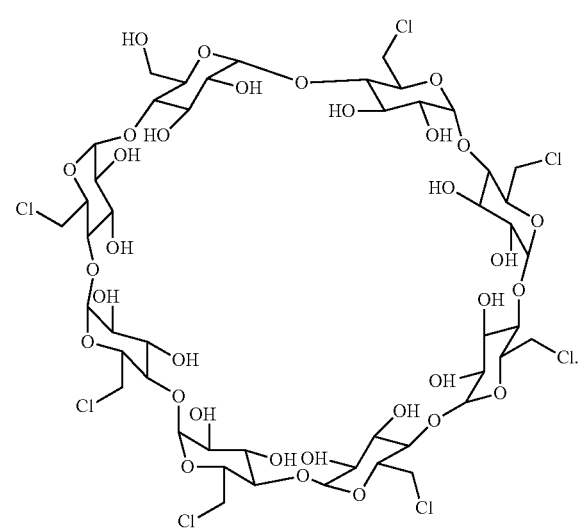

Formula I

2. The crystalline form according to claim 1, wherein said form is form I with XRPD peaks at an angle of refraction 2 theta θ of 4.1, 5.8, 8.2, 16.8, 23.5±0.2 degrees.

3. The crystalline form according to claim 1, wherein said form is form II with XRPD peaks at an angle of refraction 2 theta θ of 6.4, 11.1, 11.5, 16.1, 16.9±0.2 degrees.

4. The crystalline form according to claim 1, wherein said form is form III with XRPD peaks at an angle of refraction 2 theta θ of 7.5, 15.6, 15.9, 16.6, 17.2±0.2 degrees.

5. A process for preparing crystalline 6-per-deoxy-6-per-chloro-γ-cyclodextrin of formula I,

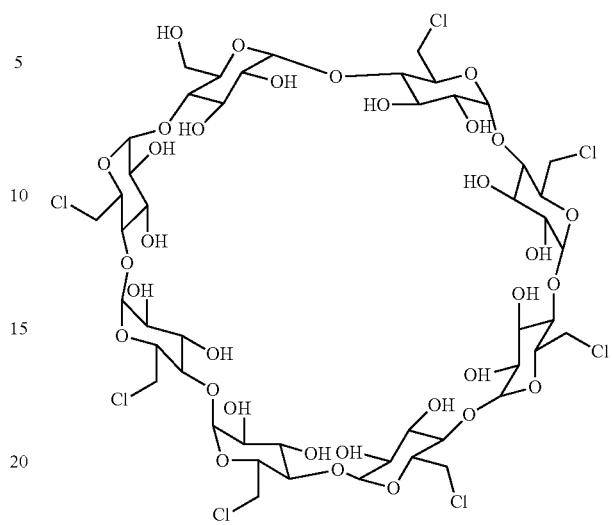

Formula I comprising:
a) dissolving 6-per-deoxy-6-per-chloro-γ-cyclodextrin in dimethylformamide,
b) adding a mixture of water and alcoholic solvent as anti-solvent, and
c) isolating crystalline 6-per-deoxy-6-per-chloro-γ-cyclodextrin.

6. The process according to claim 5, wherein the ratio of the water to alcoholic solvent in the mixture is in the range of 10/1 to 1/0.1 (v/v).

7. The process according to claim 5, wherein the water and alcoholic solvent mixture is water/methanol and the product is crystalline 6-per-deoxy-6-per-chloro-γ-cyclodextrin of form I.

8. The process according to claim 5, wherein the water and alcoholic solvent mixture is water/ethanol or water/isopropanol and the product is crystalline 6-per-deoxy-6-per-chloro-γ-cyclodextrin of form II.

9. The process according to claim 5, wherein the water and alcoholic solvent mixture is water/tert-butanol and the product is crystalline 6-per-deoxy-6-per-chloro-γ-cyclodextrin of form III.

10. The process according to claim 5, wherein 6-per-deoxy-6-per-chloro-γ-cyclodextrin of step a) is crude or pure.

11. The process of claim 5, further comprising converting the crystalline 6-per-deoxy-6-per-chloro-γ-cyclodextrin to sugammadex.

* * * * *